(No Model.)
R. OWENS & M. LEWELLYN.
TAN LIQUOR HEATER, &c.
No. 494,990.  Patented Apr. 4, 1893.
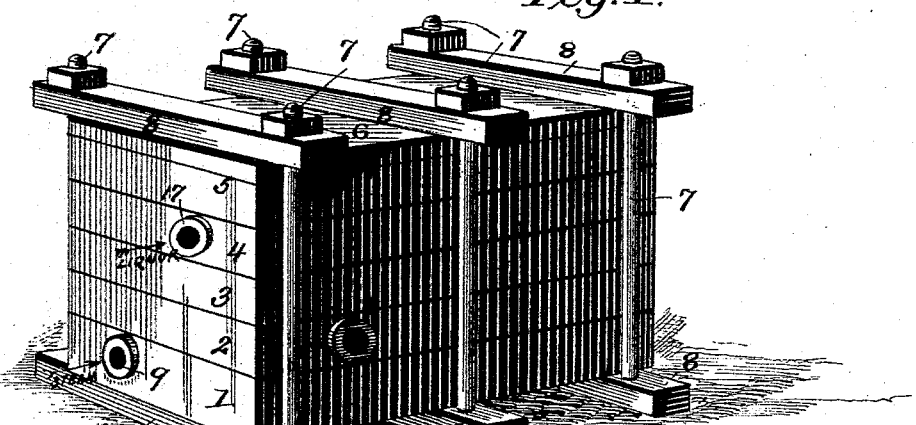
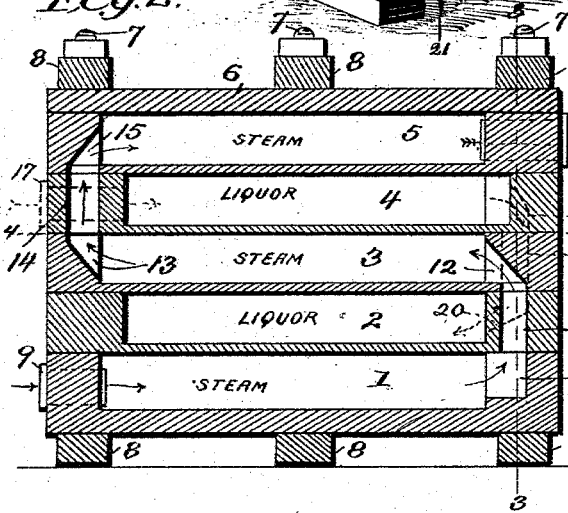
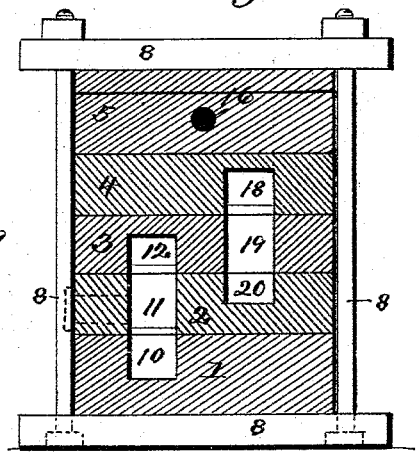
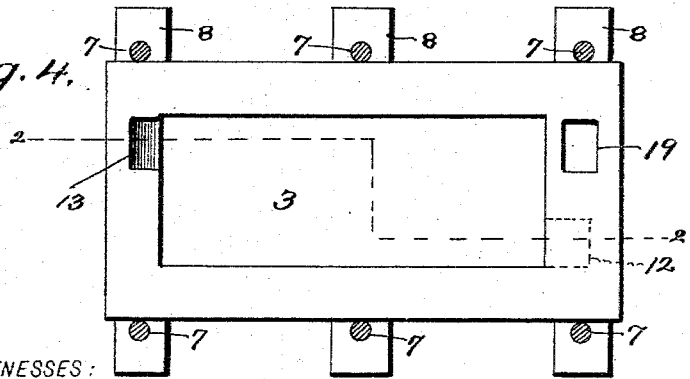
WITNESSES:
Fred G. Dieterich
Jos. A. Ryan
INVENTORS:
Ross Owens
Myron Lewellyn
BY Munn & Co
ATTORNEYS

UNITED STATES PATENT OFFICE.

ROSS OWENS AND MYRON LEWELLYN, OF OLEAN, NEW YORK, ASSIGNORS OF ONE-THIRD TO GEORGE E. RAMSEY, OF SAME PLACE.

TAN-LIQUOR HEATER, &c.

SPECIFICATION forming part of Letters Patent No. 494,990, dated April 4, 1893.

Application filed February 26, 1892. Serial No. 422,936. (No model.)

*To all whom it may concern:*

Be it known that we, ROSS OWENS and MYRON LEWELLYN, residing at Olean, in the county of Cattaraugus, in the State of New York, have invented a new and useful Improvement in Tan-Liquor Heaters, &c., of which the following is a specification.

This invention relates to an improved tan liquor heater, and the object of our invention is to provide an apparatus of this character that shall be exceedingly cheap, and simple in construction and efficient in operation; one that can be readily set up and taken down; one that can be easily and thoroughly cleaned, and one in which the liquor will be gradually and properly heated by the passage of a current of steam or other heating medium through the apparatus.

Our invention consists in certain details of construction and combination of parts, all of which are shown in the drawings, set forth in the description and pointed out in the claims.

In the drawings forming part of this specification Figure 1 is a perspective view of our improved heater. Fig. 2 is a sectional view on the line 2—2 of Fig. 4. Fig. 3 is a sectional view on the line 3—3 of Fig. 2, and Fig. 4 is a similar view on the line 4—4 of Fig. 2.

In carrying out our invention we employ a bottom heating pan or receptacle 1, a lower liquor pan or receptacle 2, arranged upon the heating pan, an intermediate heating pan 3, resting upon the liquor pan 2, an upper liquor pan or receptacle 4 upon the heating pan 3, and a top heating pan or receptacle 5, mounted upon the liquor pan, said top pan 5 having a cover 6; all of which pans are formed of copper or brass and held tightly together by means of the tie bolts 7, and the upper and lower cross bars 8. A steam inlet pipe 9 is inserted in one end of the bottom heating pan or receptacle 1, and at the opposite end of this pan is produced a steam port 10 which communicates with a steam passage 11, formed in the end of the pan 2, which passage 11 leads to a steam port 12 produced in the end of the heating pan 3 and opening into the same. A steam port 13 is provided at the opposite end of the heating pan or receptacle 3, said port connecting with a steam passage 14 made in the end of the liquor pan 4, which passage 14 in turn communicates with a steam port 15 opening into the top heating pan 5. A steam exhaust pipe 16 is arranged in the opposite end of the pan 5. The liquor is introduced into the upper liquor pan 4, through the pipe 17, and in the end of said pan opposite the inlet pipe is formed a liquor port 18 which discharges into a liquor passage 19 produced in the end of the intermediate heating pan and this passage 19 communicates with a liquor port 20 which opens into the lower liquor pan 2, as clearly shown. A liquor discharge pipe 21 is arranged in the side of the pan 2 through which the heated liquor is withdrawn from the apparatus after being gradually and thoroughly heated by the passage of the steam or other medium through the apparatus in a direction opposite to the passage of the liquor. From the above it will be seen that the liquor is carried through the heater in a tortuous course, thereby allowing it to remain within the same a sufficient length of time, and it will also be noticed that the steam or other heating medium is also led through the apparatus in a tortuous course, above, below, around and between the liquor pans, thus subjecting the liquor to a maximum quantity of heat from a minimum supply.

In operation the steam enters the bottom pan and passes upward through the ports and passages to the intermediate pan and thence through to the top pan. The liquor enters at the upper liquor pan and spreads out over the bottom of the same in a thin sheet, and then passes down into the lower liquor pan, spreading upon its bottom in a thin sheet also. The liquor pans being arranged alternately between the heating pans, and the steam passing in the opposite direction to the liquor, has the effect of gradually and thoroughly heating the liquor because when it enters the apparatus it receives heat from the top and intermediate pans which are somewhat cooler than the bottom pan, and by the time the liquor has reached the lower liquor pan it has become warmed and then by the action of the intermediate and bottom heating pans it is heated to the desired temperature.

Our apparatus consisting simply of a series of pans secured one upon the other can be quickly and easily set up and taken down, and should it become necessary can be thoroughly cleaned in a very short time.

Having thus described our invention, what we claim, and desire to secure by Letters Patent, is—

1. An improved tan liquor heater consisting of the upper, lower and intermediate heating pans, the liquor pans arranged alternately between the heating pans, the cover, cross bars and tie rods all of said pans having ports and passages in their sides substantially as shown and described.

2. In a tan liquor heater, the combination with the bottom heating pan having a steam inlet and port, of the lower liquor pan having a liquor port and outlet, and steam passage, the intermediate heating pan having steam ports and a liquor passage, the upper liquor pan having a liquor port and inlet, and steam passage the top heating pan having a steam port and exhaust and the cover all arranged substantially as shown and described.

ROSS OWENS.
MYRON LEWELLYN.

Witnesses:
ERNEST F. KRUSE,
FREDERICK W. KRUSE.